(12) United States Patent
Yao et al.

(10) Patent No.: US 6,541,073 B1
(45) Date of Patent: Apr. 1, 2003

(54) ZIRCONIUM OXIDE AND ZIRCONIUM OXIDE PRECURSOR AND PROCESS FOR PRODUCING THEM

(75) Inventors: Shigeru Yao, Chiba (JP); Yoshihisa Kakuta, Chiba (JP); Takashi Atoguchi, Chiba (JP); Tomonori Kanougi, Chiba (JP)

(73) Assignee: Ube Industries, Ltd., Ube (JP)

( * ) Notice: Subject to any disclaimer, the term of this patent is extended or adjusted under 35 U.S.C. 154(b) by 38 days.

(21) Appl. No.: 09/644,694

(22) Filed: Aug. 24, 2000

(30) Foreign Application Priority Data

| Aug. 31, 1999 | (JP) | ............................................. 11-244404 |
| Aug. 31, 1999 | (JP) | ............................................. 11-244405 |
| Apr. 25, 2000 | (JP) | ........................................ 2000-123918 |

(51) Int. Cl.$^7$ ................................................. B05D 1/18
(52) U.S. Cl. .................................................. 427/430.1
(58) Field of Search ............................ 427/430.1, 362.2

(56) References Cited

U.S. PATENT DOCUMENTS

| 4,365,011 A | * | 12/1982 | Bernard et al. ............. 429/193 |
| 5,110,361 A | * | 5/1992 | Alley et al. .................. 106/685 |
| 5,192,401 A | * | 3/1993 | DuBois et al. ................. 204/98 |
| 6,077,809 A | * | 6/2000 | Suzuki et al. ............... 502/400 |
| 6,284,314 B1 | * | 9/2001 | Kato et al. .................. 427/245 |

FOREIGN PATENT DOCUMENTS

| JP | 11-268913 A | * | 10/1999 |

OTHER PUBLICATIONS

Ronald C. Garvie, "The Occurrence of Metastable Tetragonal Zirconia as a Crystallite Size Effect," The Journal of Physical Chemistry, vol. 69, 1965, pp. 1238–1243.
R. Ramamoorthy et al., "X–ray Diffraction Study of Phase Transformation in Hydrolyzed Zirconia Nanoparparticles," Journal of European Ceramic Society 19 (1999) pp. 1827–1833.
K.S. Mazdiyasni et al., "Metastable Transitions of Zirconium Oxide Obtained from Decomposition of Alkoxides," Journal of The American Ceramic Society—Discussions and Notes, vol. 49, No. 5, 1966, pp. 286–287.
Ken–ichi Maruya et al., "Linear Relationship of the Rate of Isobutene Formation from CO and $H_2$ and $ZrO_2$ to the Monoclinic Phase Fraction," Chemistry Letters 1999, 1999, pp. 575–576.
Claudio Morterra et al., "Titrating surface acidity of sulfated zirconia catalysts: is the adsorption of pyridine a suitable probe?" Phys. Chem. Chem. Phys., 1999, 1, pp. 2825–2831.

* cited by examiner

Primary Examiner—Michael Barr
(74) Attorney, Agent, or Firm—Young & Thompson

(57) ABSTRACT

A process for producing a zirconium oxide precursor comprising precipitating a zirconium oxide precursor from an alcoholic solution of a zirconium compound, and a process for producing zirconium oxide having infrared absorption peaks assigned to an S—O bond between 1010 $cm^{-1}$ and 1025 $cm^{-1}$ and between 1035 $cm^{-1}$ and 1050 $cm^{-1}$, which comprises heat treating the zirconium oxide precursor prepared by the above process. The zirconium oxide precursor and the zirconium oxide obtained in the process are effective as a catalyst for removing or decomposing nitrogen oxides.

4 Claims, 11 Drawing Sheets

| Peak Number | 2θ | d value/Å |
|---|---|---|
| 1 | 8.3 | 10.644 |
| 2 | 27.1 | 3.2877 |
| 3 | 45.4 | 1.996 |
| 4 | 57.4 | 1.604 |

ZIRCONIUM OXIDE AND ZIRCONIUM OXIDE PRECURSOR AND PROCESS FOR PRODUCING THEM

BACKGROUND OF THE INVENTION

1. Field of the Invention

The present invention relates to zirconium oxide or a precursor thereof which can be used as an electrolyte and an electrode of fuel cells, an oxygen sensor, an oxygen-enriched membrane, a heating element, a substrate of biosensor, bioreactors, etc., a catalyst or a carrier of catalysts, a catalyst for removing or decomposing $NO_x$ of exhaust from internal combustion engines (e.g., gasoline engines and diesel engines), boilers and industrial plants, a support of artificial bone, heat-resistant materials, and the like. It also relates to a process for producing them.

2. Description of the Related Art

Zirconium oxide (zirconia), solid solutions of zirconium oxide and other oxides, zirconium oxide crystals, and porous bodies composed of these substances are highly resistant against heat and corrosion and exhibit high oxygen ion conductivity and high electron conductivity and have therefore been used as an electrolyte and an electrode of fuel cells, an oxygen sensor, an oxygen-enriched membrane, a heating element, a substrate of biosensor, bioreactors, etc., a catalyst or a carrier of catalysts, a support of artificial bone, heat-resistant materials, and the like.

In these applications, it has been demanded to establish a convenient technique for forming a thin and uniform crystal film on various substrates or, for some uses, dispersively forming a crystal precipitate on substrates for the purpose of reducing the distance of electron or ion movement thereby to increase electric conductivity or sensitivity; increasing gas permeability; securing a large surface area or contact area; or reducing the weight.

Methods of forming a thin metal oxide film include CVD, ion plating, sputtering and the like. However, these methods require special expensive equipment and meet difficulty in forming a wide thin film or a thin film on a substrate having a complicated surface profile, particularly in forming a thin film for a large-sized fuel cell.

Another method for forming a metal oxide film comprises coating a substrate with a dispersion prepared by mixing a powdered metal oxide, a binder, and a dispersant, followed by drying. With this method, however, it is difficult to form a sufficiently thin and yet strong film.

Being light and resistant to abrupt temperature changes, zirconium oxide is a promising material of various furnaces and machine parts. These parts have been manufactured by mixing powder mainly comprising microcrystalline zirconium oxide with a forming aid, a dispersant, etc., forming the mixture into a green body, and heat-treating the green body in high temperature. As reported, e.g., in *J. Phy. Chem.*, vol. 69, p. 1238 (1965), zirconium oxide is stable in its monoclinic phase in a temperature range of from room temperature to about 1100° C. and in its tetragonal or cubic phase at higher temperatures. The phase transition from the monoclinic phase to the tetragonal or cubic phase or vice versa is reversible and is accompanied with a volumetric change. That is, the phase transition repeatedly takes place through the heat treatment after forming and temperature rises and drops in practical use, which results in embrittlement of the formed body.

This can be prevented by incorporating several mole percents of yttrium oxide into zirconium oxide to restrain zirconium oxide in the high-temperature phase (i.e., the tetragonal or cubic phase). It is a generally followed practice to use yttria-stabilized zirconium oxide as a forming material. However, addition of yttrium oxide, which is expensive, increases the cost of the resulting formed body.

There is a complicated relationship between the crystal grain size and the crystal structure of pure zirconium oxide as described, e.g., in *J. European Ceram. Soc.*, vol. 19, p. 1827 (1999). It is not easy to control the relationship. Further, the method of crystal growth control, which is also complicated, is influenced by the starting compound and trace impurities present therein (see, for example, *J. Am. Ceram. Soc.*, vol. 49, p. 286 (1966)) and usually requires accurate temperature control. Moreover, crystallization takes a long time.

On the other hand, *Chem. Lett.*, p. 575 (1999) reports that a zirconium oxide catalyst for selectively synthesizing isobutene from a carbon monoxide/hydrogen mixed gas has its selectivity perfectly correlated to the content of monoclinic crystals. *Phys. Chem. Chem. Phys.*, vol. 1, p. 2825 (1999) teaches that an acid catalyst comprising a zirconium oxide carrier having sulfate ions supported thereon shows correlation between the amount of supported sulfate ions and the surface structure of the carrier that is decided by the crystal form. It is therefore conceivable that the function as an acid catalyst varies depending on the crystal form. Accordingly, in order to efficiently design a high-performance catalyst, a method for selectively obtaining zirconium oxide of desired crystal form has been sought.

SUMMARY OF THE INVENTION

An object of the present invention is to provide a process for produce thin film of zirconium oxide and a process for efficiently produce zirconium oxide having a specific crystal structure and zirconium oxide crystals obtained by the process.

Another object of the present invention is to provide a process for producing zirconium oxide or a precursor thereof, by which a thin and dense film comprising small particles of zirconium oxide or a precursor thereof can easily be formed on various substrates including organic substances, large-area substrates, or substrates having a complicated surface profile such as a porous material by means of simple equipment and without requiring a heating step for crystallization for stabilization; and zirconium oxide or a precursor thereof prepared by the process.

Still another object of the present invention is to provide zirconium oxide or a precursor thereof which is capable of effectively reduce or decompose nitrogen oxides ($NO_x$) contained in exhaust, etc. and which can easily be produced.

The present inventors have conducted extensive investigation to accomplish the above objects. As a result, they have found that desired zirconium oxide or a precursor thereof can be obtained from an alcohol solution of a zirconium compound through simple operations. They have also found that the resulting zirconium oxide has characteristic peaks assigned to a specific S—O bond in the infrared absorption spectrum and that the peaks are different from those assigned to the S—O bond of commercially available sulfated zirconia.

Based on the above findings, the invention provides:

1) Zirconium oxide having infrared absorption peaks between 1010 $cm^{-1}$ and 1025 $cm^{-1}$ and between 1035 $cm^{-1}$ and 1050 $cm^{-1}$ which are assigned to an S—O bond.

2) A process for producing a zirconium oxide precursor comprising dissolving a zirconium compound in an alcohol, immersing a substrate in the solution, and precipitating a zirconium oxide precursor on the substrate, a zirconium oxide precursor composite obtained by the process, and a catalyst for removing nitrogen oxides which comprises the zirconium oxide precursor.

3) A process for producing a zirconium oxide precursor comprising dissolving a zirconium compound in an alcohol and allowing the zirconium compound to react at a temperature of from 0° C. up to the boiling point of the system to precipitate a zirconium oxide precursor, a zirconium oxide precursor obtained by the process, and a catalyst for removing nitrogen oxides which comprises the zirconium oxide precursor.

4) Zirconium oxide obtained by dissolving a zirconium compound in an alcohol, allowing the zirconium compound to react at a temperature of from 0° C. up to the boiling point of the system to precipitate a zirconium oxide precursor, and heat treating the resulting zirconium oxide precursor at a temperature ranging from 250 to 1500° C., and a catalyst for decomposing nitrogen oxides which comprises the zirconium oxide.

5) A zirconium oxide composite obtained by dissolving a zirconium compound in an alcohol, allowing the zirconium compound to react at a temperature of from 0° C. up to the boiling point of the system to precipitate a zirconium oxide precursor on a substrate immersed in the solution, and heat treating the precursor at a temperature ranging from 250 to 1500° C.

6) A process for producing zirconium oxide having a cubic crystal structure which comprises precipitating crystals from an alcohol solution of a zirconium compound and firing the crystals, zirconium oxide having a cubic crystal structure obtained by the process, and a catalyst for decomposing nitrogen oxides which comprises the zirconium oxide having a cubic crystal structure.

7) A process for producing zirconium oxide having a monoclinic crystal structure which comprises precipitating crystals from an alcohol solution of a zirconium compound, aging the crystals in a controlled atmosphere, and firing the aged crystals, zirconium oxide having a monoclinic crystal structure obtained by the process, and a catalyst for decomposing nitrogen oxides which comprises the zirconium oxide having a monoclinic crystal structure.

According to the process for producing zirconium oxide of the present invention, zirconium oxide having a desired crystal structure can be produced easily and efficiently without involving a complicated step.

According to the process for producing zirconium oxide or a precursor thereof of the present invention, a thin and dense film comprising small particles of zirconium oxide or a precursor thereof can easily be formed on various substrates such as an organic substance, large-area substrates, or substrates of complicated surface profile such as a porous material by means of simple equipment. In using a porous film or a porous material as a substrate, zirconium oxide or a precursor thereof easily fills the inside of the pores on the substrate surface.

The zirconium oxide or the zirconium oxide precursor of the present invention is capable of effectively reducing or decomposing nitrogen oxides present in exhaust gas, etc. and therefore useful as a catalyst for removing or decomposing nitrogen oxides.

BRIEF DESCRIPTION OF THE DRAWINGS

The present invention will be more particularly described with reference to the accompanying drawings, in which.

DETAILED DESCRIPTION OF THE INVENTION

Figure 1:
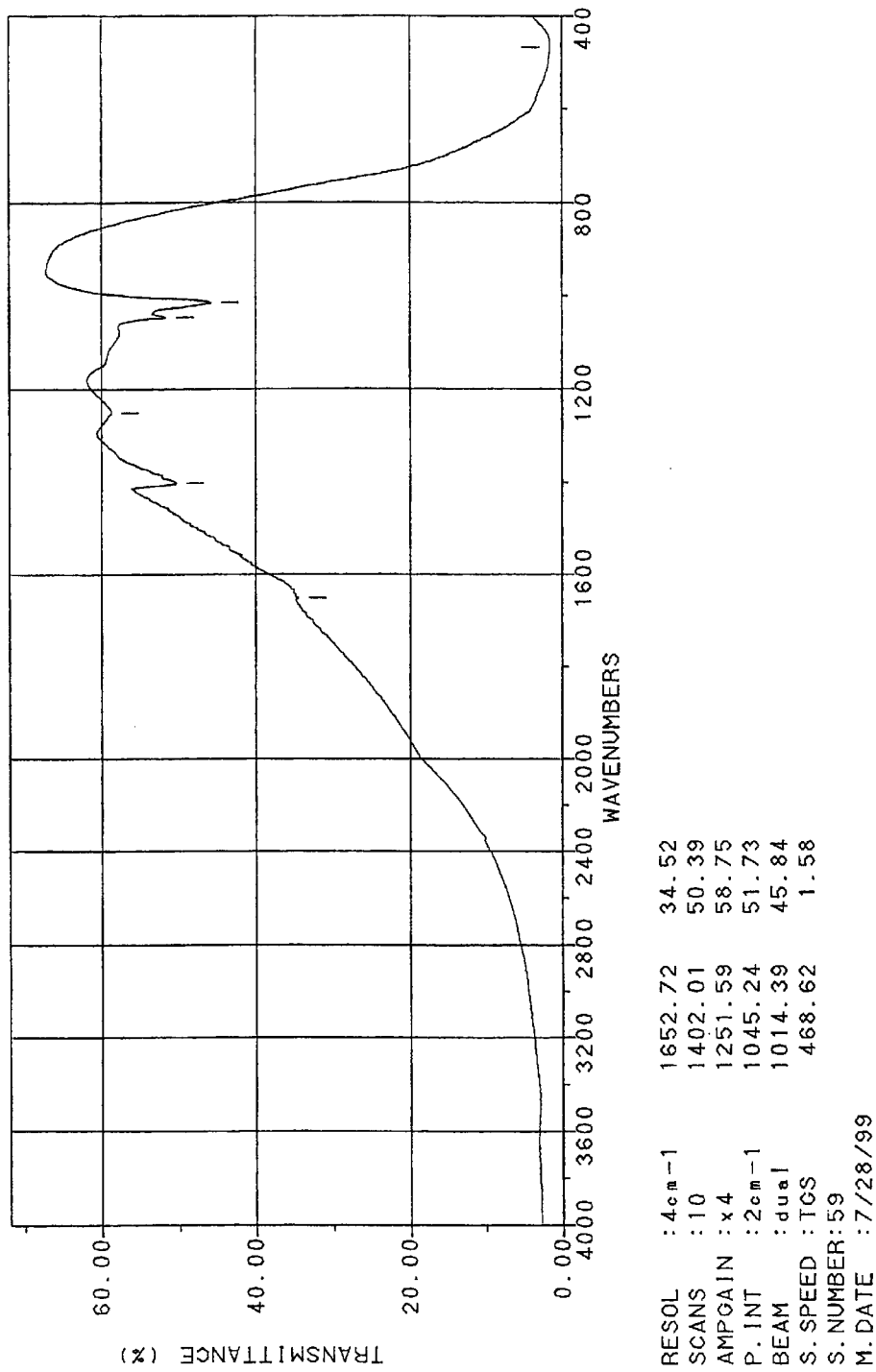
FIGS. 1 and 2 are infrared absorption spectra of the zirconium oxide according to the present invention.

The zirconium oxide precursor of the present invention and processes for producing the same are described first. A first process for producing a zirconium oxide precursor of the invention comprises dissolving a zirconium compound in an alcohol and leaving a substrate to stand as immersed in the solution thereby to form a dense thin film of a zirconium oxide precursor on the substrate. Where a porous film or material is used as a substrate, a zirconium oxide precursor can be formed even in the inside of the pores on the substrate surface so that the resulting zirconium oxide precursor composite has a high content of the zirconium oxide precursor per unit area.

While the alcohol which can be used is not particularly limited, a dense thin film is obtained with methanol, and the surface of the film tends to become rough as the alkyl chain length of the alcohol increases. A mixture of two or more alcohols or a mixture of an alcohol(s) and water can also be used. While not limiting, the concentration of water in the mixed solvent is preferably $10^{-6}$ to $10^{-1}$ vol %.

The zirconium compound as a starting material includes zirconium salts, zirconium oxide salts, and organozirconium compounds, such as zirconium chloride, zirconium oxychloride, zirconium nitrate, zirconium oxynitrate, zirconium sulfate, acetylacetonatozirconium, and a zirconium-porphyrin complex, with zirconium sulfate ($Zr(SO_4)_2$) being preferred. Generally available zirconium sulfate can be used. Zirconium sulfate in the form of a hydrate may be used.

The zirconium compound is dissolved in an alcohol of choice. In using methanol, a suitable concentration of the zirconium compound in the solution is usually $10^{-3}$ to $10^{-1}$ mol/l. In a lower concentration a sufficiently longer precipitation time provides the zirconium oxide precursor as well. The alcoholic solution may be such that is prepared by stirring an excess zirconium compound in an alcohol and filtering off the excess remaining undissolved.

A wide variety of substrates, either organic or inorganic, can be used as a substrate. Illustrative examples of suitable substrates are metals, such as aluminum foil and titanium foil, glass, ceramics, such as alumina, paper, and polymers, such as polyolefins, polyamide, polyimide, polyester and polyvinyl chloride. The substrate can have an arbitrary shape, including plates, wavy plates, columns, cylinders, honeycomb structures, fibers, films, and those with a complicated profile, such as a porous film and a porous body.

While the reaction temperature is arbitrarily selected from the range in which the system keeps the solution phase, a thin film is hardly formed at lower temperatures than 10° C. A preferred reaction temperature is from 10° C. up to the boiling point of the solvent, particularly from 30 to 45° C. Room temperature reaction is advantageous, needing no means for heating or cooling. The reaction time is also arbitrary. Formation of a thicker film requires a longer time.

If desired the step of film formation may be followed by a drying step. The drying temperature is preferably, but not limited to, 5 to 40° C. The drying time is not particularly limited. For example, in case of using a nylon 6 substrate, drying is preferably carried out at 5 to 40° C. for about 15 minutes to 1 hour.

There is thus formed a thin film of a zirconium oxide precursor having a thickness of 0.001 to 10 µm or a thicker film on the substrate.

It has been confirmed that the zirconium oxide precursor obtained by the above-described process contains a sulfate group from its infrared absorption spectrum.

A second process for producing a zirconium oxide precursor according to the present invention comprises dissolving a zirconium compound in an alcohol and allowing the zirconium compound to react at a temperature of from 0° C. up to the boiling point of the system by (a) leaving the system to stand, (b) heating the system with stirring, or (c) heating the system under reflux, whereupon a zirconium oxide precursor precipitates in the system. If desired, a substrate can be immersed in the alcohol solution so that the zirconium oxide precursor may be formed on that substrate.

Figure 9:
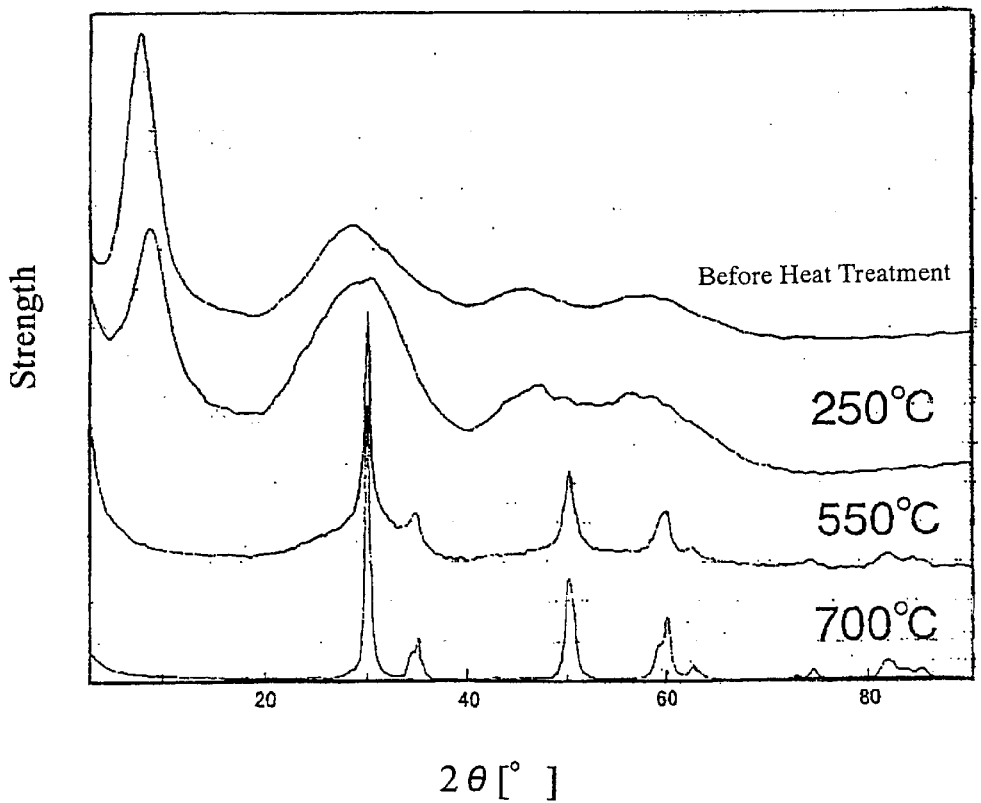
FIG. 9 shows X-ray diffraction spectra of the zirconium oxide obtained in Example 12.

The zirconium oxide precursor obtained by the second process contains 5 to 12% by weight of sulfur, 42 to 52% by weight of oxygen, and 36 to 47% by weight of zirconium. It is assumed that sulfur exists in the form of a sulfate group. It is sometimes observed that the zirconium oxide precursor further contains hydrogen, carbon, etc. The X-ray diffraction pattern typically exhibited by the resulting zirconium oxide precursor is shown in FIG. 9 (the "before heat treatment" pattern).

In the embodiment (a) in which the reaction is effected by allowing the system to stand, the reaction is conveniently carried out by placing a container containing an alcohol solution of a zirconium compound in a thermostat kept at a prescribed temperature for 1 to 14 days, preferably 2 to 7 days.

In the embodiment (c) in which the reaction is conducted by heating the system under reflux, the reaction is conveniently effected by heating the reaction system in a flask equipped with a general reflux condenser at a temperature near the boiling point of the system. While not limiting, the reaction time is usually 1 to 10 hours, preferably 2 to 5 hours.

The zirconium compound, the alcohol, and the substrate which can be used in the second process are the same as those useful in the first process. The alcoholic solution of a zirconium compound is prepared in the same manner as described as for the first process.

Where a substrate is not used in the second process, the zirconium oxide precursor precipitates in the form of powder. The precipitate is ground to powder, which is used as such or formed into pellets or fixed onto a commercially available substrate such as silica, alumina or a honeycomb structure. Fixation on the substrate can be conducted with great ease by a reflux method. The precipitated powder is dried in vacuo to remove the solvent.

The zirconium oxide precursor according to the present invention is useful as a catalyst for removing nitrogen oxides. Upon contact with nitrogen oxide gas in exhaust, it can remove nitrogen oxides through adsorption at 0 to 200° C. and decomposition at 200 to 600° C.

The zirconium oxide of the present invention and processes for producing the same are then described. The zirconium oxide of the invention can be obtained by heat treating the zirconium oxide precursor obtained by the above-described processes at a temperature ranging from 250 to 1500° C. Zirconium oxide with a desired crystal structure can be obtained with ease by properly selecting the process of producing the zirconium oxide precursor and the conditions of the heat treatment.

For example, zirconium oxide with a cubic crystal structure can easily be obtained as follows. A zirconium compound alcoholic solution prepared as described above is refluxed in a general flask equipped with a refluxing condenser to precipitate a zirconium oxide precursor. The refluxing temperature depends on the solvent. It is generally preferred to conduct refluxing within ±10° C. of the boiling point of the solvent. While not limiting, the treating time is usually 1 to 10 hours, preferably 2 to 5 hours. The precipitated zirconium oxide precursor is fired at 400 to 900° C., preferably 500 to 700° C., to give zirconium oxide having a cubic crystal structure. Before firing, the precursor may be vacuum dried to remove the solvent.

The thus obtained zirconium oxide according to the present invention exhibits infrared absorption peaks assigned to an S—O bond between 1010 cm$^{-1}$ and 1025 cm$^{-1}$ and between 1035 cm$^{-1}$ and 1050 cm$^{-1}$, which are different from those assigned to the S—O of commercially available sulfated zirconia, zirconium oxide having sulfate ions supported thereon (see FIGS. 1 through 4).

Zirconium oxide having a monoclinic crystal structure can easily be obtained as follows. The precursor to be used in this case can be prepared either by allowing the system to stand or by refluxing. In the former case, the alcoholic zirconium compound solution is put in a closed container and allowed to stand still at a temperature of from 0° C. to the boiling point of the solvent, preferably from 20 to 50° C., for 1 hour to 1 week, preferably 12 to 48 hours, to precipitate a zirconium oxide precursor. In the latter case, the alcoholic zirconium compound solution is refluxed in the same manner as described above for the preparation of zirconium oxide having a cubic crystal structure, to precipitate a zirconium oxide precursor.

The resulting zirconium oxide precursor is allowed to stand for aging at prescribed temperature and humidity. The temperature is selected from 0 to 80° C., preferably 10 to 60° C., and the humidity is selected from 0 to 100%, preferably 70 to 99%. The aging time is 5 to 100 hours, preferably 10 to 40 hours. After aging, the precursor is fired at 400 to 1000° C., preferably 500 to 700° C., to give zirconium oxide having a monoclinic crystal structure. Before firing, the precursor may be vacuum dried to remove the solvent.

If desired, a substrate, such as an organic film (e.g., a porous film), silica, alumina, or a honeycomb structure made of ceramics or stainless steel, can be set in the precipitation system to form the zirconium oxide precursor on the substrate, which is then fired to have zirconium oxide of desired crystal structure stably fixed on the substrate.

The zirconium oxide of the present invention is useful as a catalyst for decomposing nitrogen oxides. For example, on contact with nitrogen oxide gas in exhaust, it directly acts on decomposition of nitrogen oxides even in a relatively low temperature of 200 to 600° C.

The present invention will now be illustrated in greater detail with reference to Examples, but it should be understood that the invention is not construed as being limited thereto.

EXAMPLE 1

Figure 5:
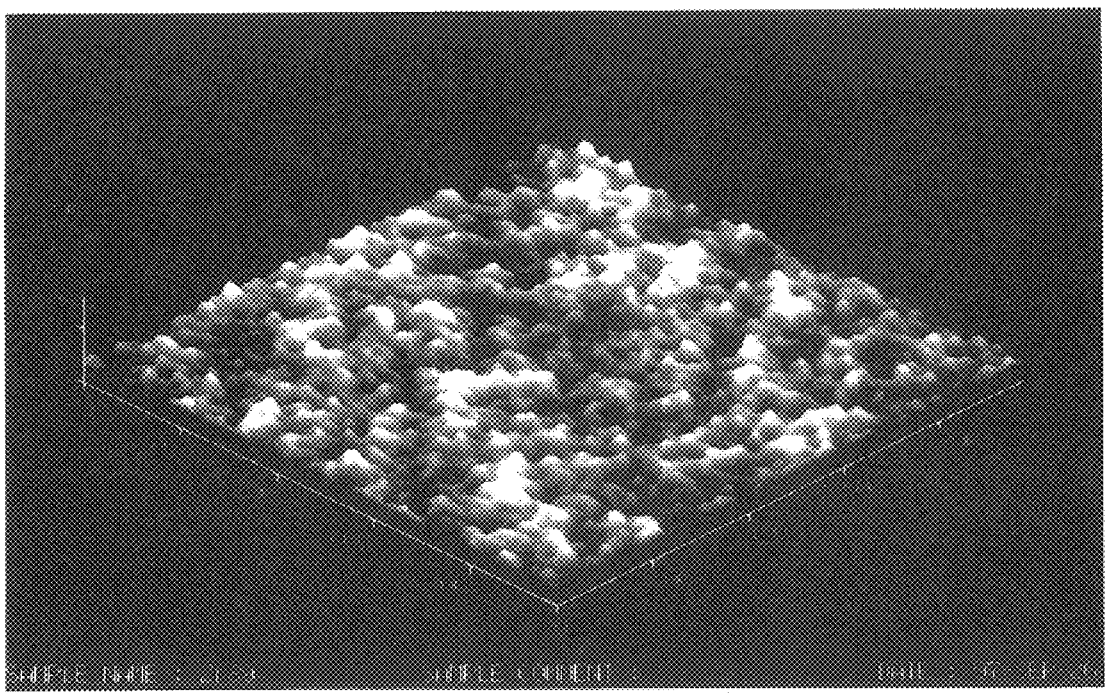
FIG. 5 is an AFM (atomic force microscope) micrograph of the zirconium oxide precursor thin film obtained in Example 1.
Figure 6:
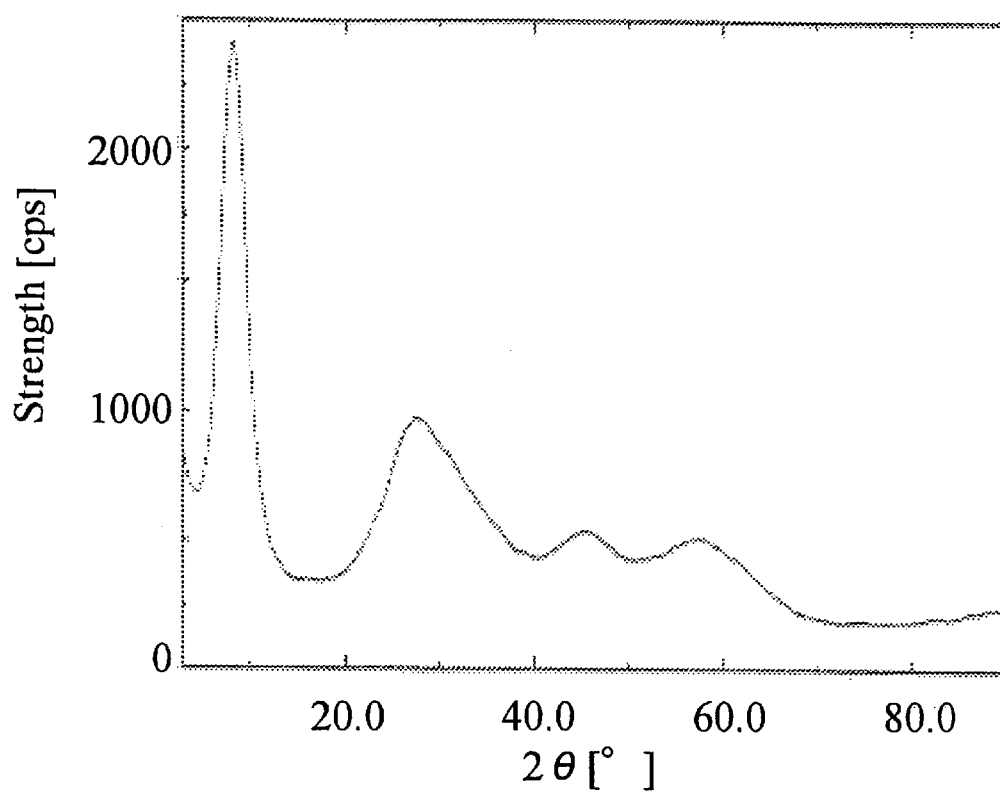
FIG. 6 is an X-ray diffraction spectrum of the zirconium oxide precursor thin film obtained in Example 1.

In 20 ml of methanol was completely dissolved 0.1 g of zirconium sulfate tetrahydrate ($Zr(SO_4)_2.4H_2O$) by stirring. A substrate made of glass, aluminum foil, polyethylene or polyimide was immersed in the solution and left to stand at 30° C. for 3 days. After drying at 15° C. for 1 hour, each substrate was found to have formed thereon a transparent thin film of a zirconium oxide precursor to a thickness of 0.5 to 1 $\mu$m, which comprised particles of from several nanometers to several tens of nanometers. As a result of elemental analysis, the thin film was found to be made up of 36 wt % of Zr, 47 wt % of O, 9.6 wt % of S, and 2.5 wt % of H. In FIGS. 5 and 6 are shown the AFM micrograph and the X-ray diffraction pattern, respectively, of the thin film formed on the polyimide substrate. These data reveal formation of a dense film made of small crystalline particles. Presence of a sulfate group was confirmed by measuring the infrared absorption spectrum.

EXAMPLE 2

In 20 ml of ethanol was added 0.1 g of zirconium sulfate tetrahydrate ($Zr(SO_4)_2.4H_2O$) and stirred, followed by filtration to remove undissolved zirconium sulfate. Separately, 0.1 g of zirconium sulfate was stirred in 20 ml of a 1:1 mixed solvent of methanol and n-butanol, followed by filtration to remove undissolved zirconium sulfate. A glass or polyimide substrate was immersed in each solution and allowed to stand at 30° C. for 3 days. After drying at 15° C. for 1 hour, each substrate from each solution was found to have formed thereon a transparent thin film of a zirconium oxide precursor having a thickness of 0.5 to 1 $\mu$m, which comprised particles of from several nanometers to several tens of nanometers. Elemental analysis revealed that these thin films were made up of 36 wt % of Zr, 47 wt % of O, 9.6 wt % of S, and 2.5 wt % of H.

EXAMPLE 3

In 20 ml of methanol was completely dissolved 0.1 g of zirconium sulfate tetrahydrate ($Zr(SO_4)_2.4H_2O$) by stirring. To the solution was added 0.1 g of zirconium oxide ($ZrO_2$) and stirred to make a white suspension, which was filtered. A substrate made of glass, aluminum foil, polyethylene or polyimide was immersed in the filtrate and allowed to stand at 30° C. for 1 day. After drying at 15° C. for 1 hour, each substrate was found to have formed thereon a semitransparent thin film of a zirconium oxide precursor.

EXAMPLE 4

Figure 7:
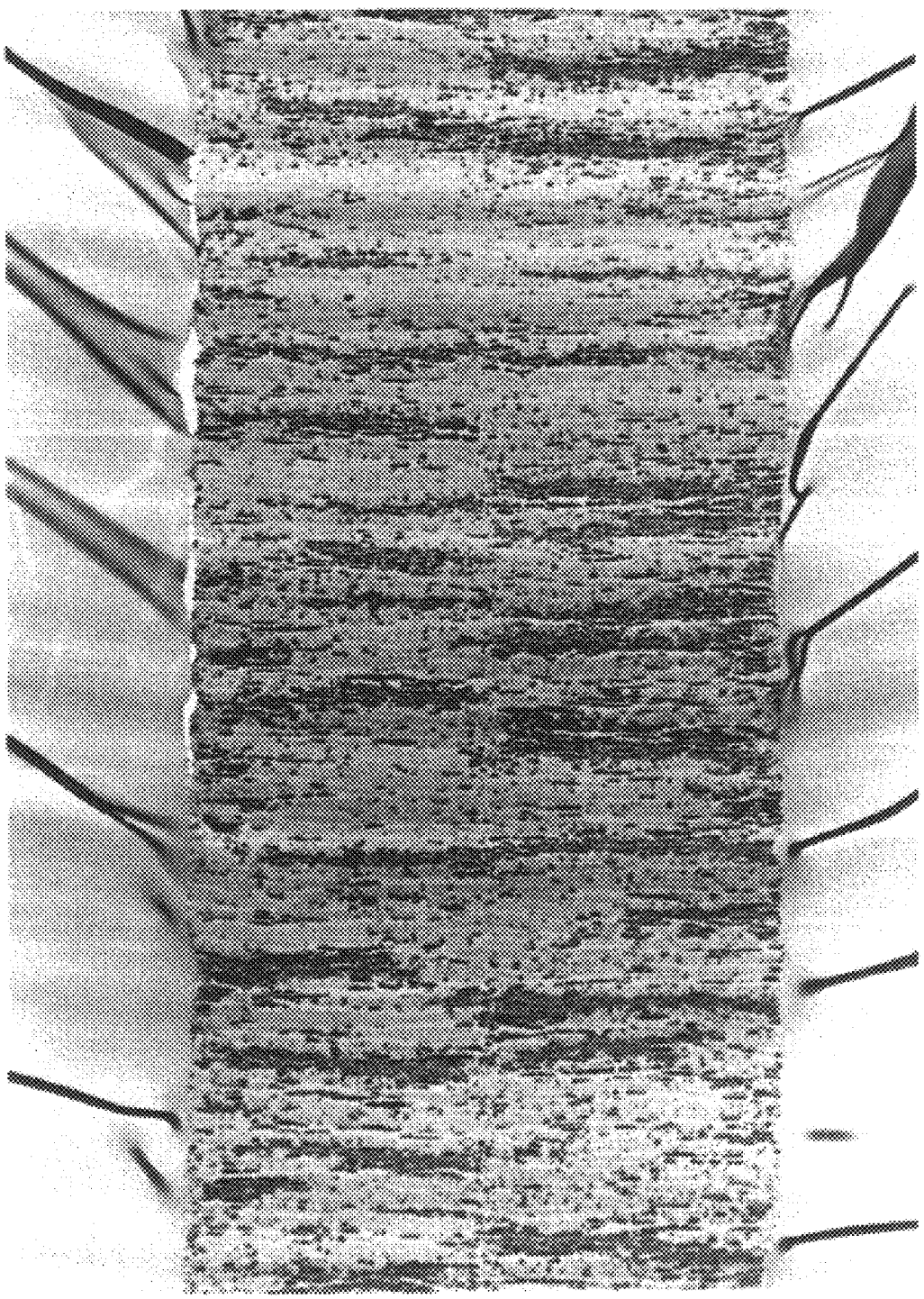
FIG. 7 is a TEM (transmission electron microscope) micrograph of a section of a composite composed of a porous polypropylene substrate and a zirconium oxide precursor film, obtained in Example 4.

In 20 ml of methanol was completely dissolved 0.1 g of zirconium sulfate tetrahydrate ($Zr(SO_4)_2.4H_2O$) by stirring. A porous polypropylene substrate was immersed in the solution and allowed to stand at 30° C. for 2 days. After drying at 15° C. for 1 hour, the substrate was found to have a thin film of a zirconium oxide precursor formed in the inside thereof. The TEM photograph of a section of the porous polypropylene with the thin film is shown in FIG. 7, in which the white parts are polypropylene, and the black parts are the precipitated zirconium oxide precursor. It is seen from the micrograph that the zirconium oxide precursor had been formed even in the inside of the porous substrate, which indicates that a thin film can be formed on various surface profiles. It was confirmed that the resulting composite material adsorbs NO and serves as a catalyst for removing $NO_x$.

EXAMPLE 5

In 10 ml of methanol was completely dissolved 0.1 g of zirconium sulfate tetrahydrate ($Zr(SO_4)_2.4H_2O$) by stirring. A glass or polyimide substrate was immersed in the solution and allowed to stand at 40° C. for 1 day. After drying at 15° C. for 1 hour, each of the substrates was found to have formed thereon a transparent thin film of a zirconium oxide precursor having a thickness of 0.5 to 1 $\mu$m, which comprised particles of from several nanometers to several tens of nanometers.

EXAMPLE 6

In 20 ml of methanol was completely dissolved 0.1 g of zirconium sulfate tetrahydrate ($Zr(SO_4)_2.4H_2O$) by stirring. A glass, aluminum foil, polyethylene or polyimide substrate was immersed in the solution and allowed to stand at 35° C. for 2 days. After drying at 15° C. for 1 hour, each substrate was found to have formed thereon a transparent thin film of a zirconium oxide precursor having a thickness of 0.5 to 1 $\mu$m, which comprised particles of from several nanometers to several tens of nanometers.

EXAMPLE 7

In 20 ml of methanol was completely dissolved 0.1 g of zirconium sulfate tetrahydrate ($Zr(SO_4)_2.4H_2O$) by stirring. A nylon 6 substrate was immersed in the solution and allowed to stand at 35° C. for 2 days. After drying at 30° C. for 15 minutes, the substrate was found to have formed thereon a white thin film of a zirconium oxide precursor having a thickness of about 5 $\mu$m.

EXAMPLE 8

In 20 ml of methanol was completely dissolved 0.1 g of zirconium sulfate tetrahydrate ($Zr(SO_4)_2.4H_2O$) by stirring. A nylon 6 substrate was immersed in the solution and allowed to stand at 35° C. for 2 days. After drying at 15° C. for 1 hour, the substrate was found to have formed thereon a transparent thin film of a zirconium oxide precursor having a thickness of about 1 $\mu$m.

EXAMPLE 9

In 200 ml of methanol was completely dissolved 1 g of zirconium sulfate tetrahydrate ($Zr(SO_4)_2.4H_2O$) by stirring. A nylon 6 film substrate (5 cm by 5 cm; thickness: 100 $\mu$m) was immersed in the solution and allowed to stand in a closed system at 30° C. for 3 days. After drying at 15° C. for 1 hour, the nylon 6 film was found to have formed thereon a transparent thin film of a zirconium oxide precursor having a thickness of 0.5 to 1 $\mu$m, which comprised particles of from several nanometers to several tens of nanometers. Elemental analysis revealed that the thin film was made up of 36 wt % of Zr, 47 wt % of O, 9.6 wt % of S, and 2.5 wt % of H.

Figure 8:
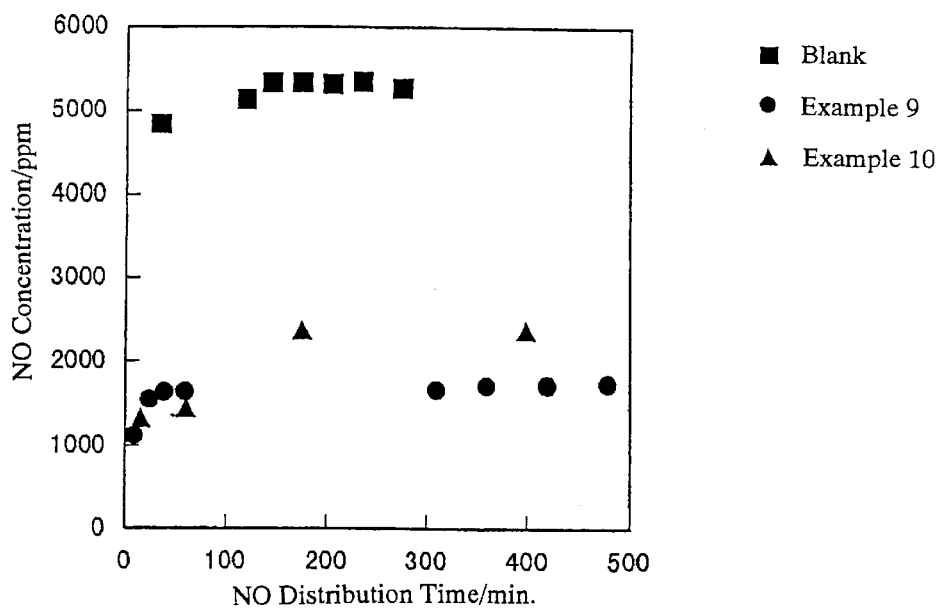
FIG. 8 graphically represents removal of nitrogen monoxide by the zirconium oxide precursors obtained in Examples 9 and 10.

Ten sheets of the resulting composite material composed of the nylon 6 film (substrate) and the thin film of the zirconium oxide precursor, of which the zirconium oxide precursor film totally weighed 0.79 g, were packed into a quartz straight reaction tube having an inner diameter of 10 mm. The packed catalyst layer was about 20 cm long. A mixed gas of argon and 5000 ppm of nitrogen monoxide was passed through the packed catalyst layer at a rate of 50 ml/min at 25° C., and the NO concentration of effluent gas from the catalyst layer was analyzed by gas chromatography. The results are plotted in solid circles against time in FIG. 8. The plot in solid squares in FIG. 8 are the results obtained in the same manner, except for using the nylon 6 film having no zirconium oxide precursor (blank).

EXAMPLE 10

A quartz straight reaction tube (inner diameter: 10 mm) was packed with a nylon 6 composite material prepared in the same manner as in Example 9, except that the total amount of the zirconium oxide precursor was 0.70 g. A mixed gas of argon and 5000 ppm of nitrogen monoxide was passed through the packed catalyst layer at a rate of 30 ml/min at 25° C., and the NO concentration of effluent gas was analyzed by gas chromatography. The results obtained are plotted in solid triangles in FIG. 8.

EXAMPLE 11

A quartz straight reaction tube (inner diameter: 10 mm) was packed with a composite material comprising 1.4 g of an alumina substrate (TH-1, available from Mizusawa Kagaku Kogyo K. K.) having formed thereon 0.150 g of a zirconium oxide precursor. In packing, the composite material was divided into two equal portions, and quartz beads were packed between the two portions and in the front and the rear of the portions. The total length of the composite material layer (catalyst layer) was about 15 mm. A mixed gas of helium and 1000 ppm of nitrogen monoxide was passed through the packed reaction tube at a rate of 50 ml/min at a temperature varied from 25 to 600° C. The effluent gas from the catalyst layer was analyzed by gas chromatography to obtain the percent conversion of NO. The results obtained are shown in Table 1 below.

TABLE 1

| Temp. (° C.) | NO Conversion (%) |
| --- | --- |
| 300 | 6.8 |
| 400 | 15.4 |
| 500 | 63.3 |
| 600 | 100 |

EXAMPLE 12

In 200 ml of methanol was dissolved 1.006 g of zirconium sulfate tetrahydrate ($Zr(SO_4)_2 \cdot 4H_2O$), and the solution was refluxed with stirring in a flask equipped with a reflux condenser for about 3 hours. The solution was cooled, and the precipitate was collected by filtration and dried in vacuo to obtain a zirconium oxide precursor.

The resulting zirconium oxide precursor was packed in a stainless steel straight tubular reactor and heated to 250° C., 550° C. or 700° C. at a rate of about 6.6° C./min. The resulting zirconium oxide was subjected to X-ray diffractometry and elemental analysis. The results obtained are shown in FIG. 9 and Table 2 below together with the results of the precursor (before the heat treatment).

TABLE 2

Elemental Analysis* on Zirconium Oxide

| | H | C | O | S | Zr |
| --- | --- | --- | --- | --- | --- |
| Precursor (before heat treatment) | 2.38 | N.D. | 46 | 5.76 | 43.69 |
| 250° C. | 1.12 | 1.34 | 38 | 6.08 | 53.66 |
| 550° C. | N.D. | 0.47 | 28 | 6.73 | 63.75 |
| 700° C. | 0.35 | N.D. | 31 | 2.21 | 65.71 |

*Method or equipment of elemental analysis:
S, Zr: X-ray fluorescence analysis
H: CHN elemental analysis
O: apparatus for simultaneous analysis of nitrogen and oxygen
C: apparatus for carbon analysis

EXAMPLE 13

In 200 ml of methanol was dissolved 1.006 g of zirconium sulfate tetrahydrate ($Zr(SO_4)_2 \cdot 4H_2O$). To the solution was added 2.00 g of γ-alumina powder having been calcined at 150° C. for 3 hours, and the mixture was refluxed while stirring in a flask equipped with a refluxing condenser for about 3 hours. The system was cooled, and the precipitate was collected by filtration and dried in vacuo to obtain a zirconium oxide precursor.

A straight tubular reactor made of stainless steel was packed with 1.4 g of the resulting composite material containing 0.16 g of the zirconium oxide. The packed reactor was purged with helium gas and heated from room temperature to 400° C. at a rate of about 6.6° C./min and then from 400° C. up to 600° C. at a rate of 3.3° C./min and maintained at 600° C. while passing a mixed gas of helium and 1000 ppm of nitrogen monoxide through the reactor at a rate of 50 ml/min. The effluent gas was analyzed with an on-line TCD gas chromatograph. It was found that NO decomposition reaction started from 350° C., and the NO conversion reached 100% at 60° C. The percent conversion of 100% was maintained while the temperature was kept constant at 600° C. The results obtained are shown in Table 3 below.

TABLE 3

| Temp. (° C.) | NO Conversion (%) |
| --- | --- |
| 300 | 1.0 |
| 400 | 10.9 |
| 500 | 61.2 |
| 600 | 100.0 |

EXAMPLE 14

In 200 ml of methanol was dissolved 1.006 g of zirconium sulfate tetrahydrate ($Zr(SO_4)_2 \cdot 4H_2O$). To the solution was added 2.00 g of silica gel having been calcined at 150° C. for 3 hours, and the mixture was refluxed while stirring in a flask equipped with a refluxing condenser for about 3 hours. The system was cooled, and the precipitate was collected by filtration and dried in vacuo to obtain a zirconium oxide precursor.

A straight tubular reactor of stainless steel was packed with 1.4 g of the resulting composite material containing 0.25 g of the zirconium oxide. After purging the packed reactor with helium gas, the catalyst layer was heated from room temperature to 400° C. at a rate of about 6.6° C./min and then from 400° C. up to 600° C. at a rate of 3.3° C./min and maintained at 600° C. while passing a mixed gas of helium and 1000 ppm of NO through the reactor at a rate of 50 ml/min. The effluent gas was analyzed with an on-line TCD gas chromatograph. NO decomposition reaction started from 200° C. The results obtained are shown in Table 4 below.

TABLE 4

| Temp. (° C.) | NO Conversion (%) |
|---|---|
| 200 | 7.95 |
| 300 | 14.6 |
| 400 | 43.3 |
| 500 | 67.5 |
| 600 | 76.3 |

COMPARATIVE EXAMPLE 1

A test of NO decomposition was carried out in the same manner as in Example 13, except for replacing the alumina-zirconium oxide composite material with 0.5 g of commercially available sulfated zirconia. The effluent gas was analyzed with an on-line TCD gas chromatograph. As a result, the NO conversion was as low as 32% even when the catalyst temperature reached 600° C.

EXAMPLE 15

Figure 10:
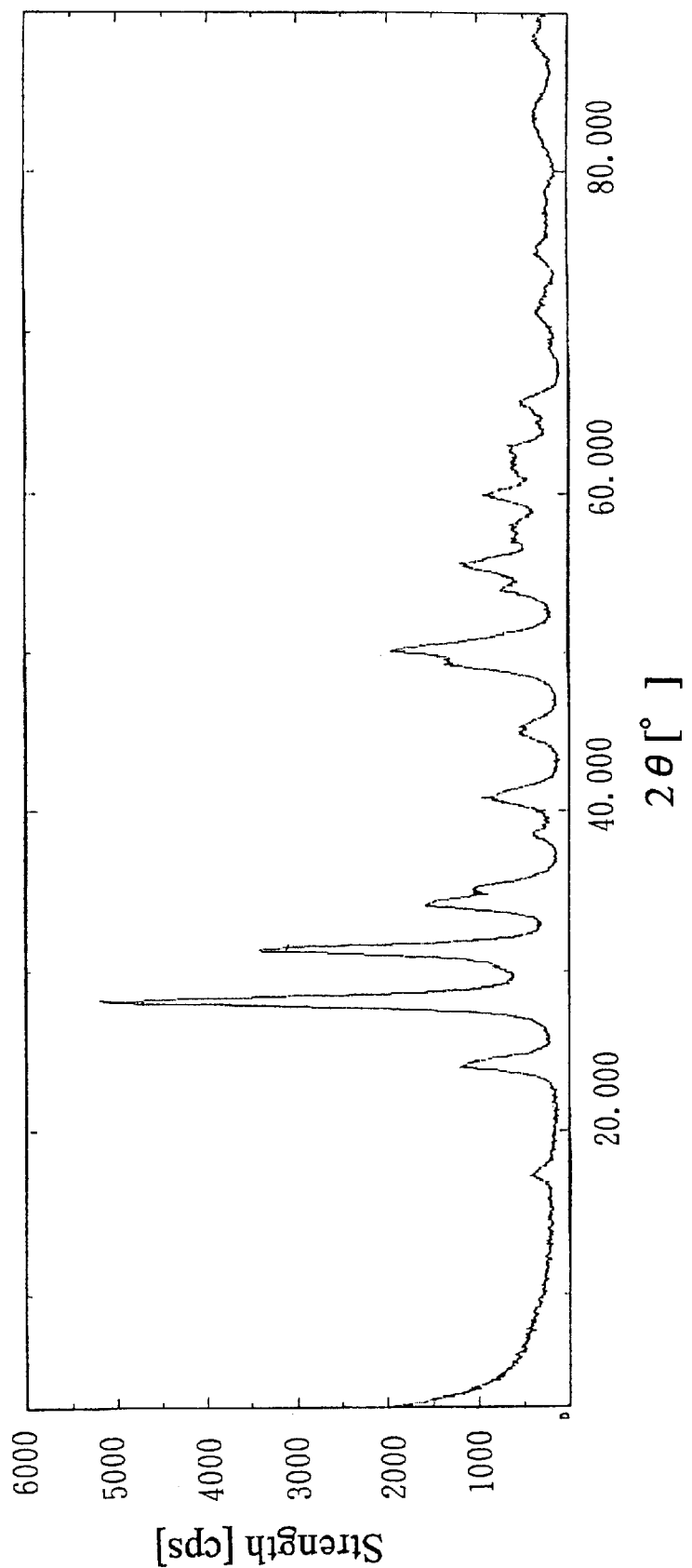
FIG. 10 is an X-ray diffraction spectrum of the zirconium oxide obtained in Example 15.

In 400 ml of methanol was completely dissolved 4 g of zirconium sulfate tetrahydrate ($Zr(SO_4)_2 \cdot 4H_2O$) by stirring, and the solution was left to stand in a closed container at 35° C. for 2 days. The precipitate thus formed was collected by filtration and aged at 15° C. and 95% RH for 24 hours, followed by vacuum drying to obtain a zirconium oxide precursor. The precursor was fired at 700° C. to give monoclinic zirconium oxide. The X-ray diffraction pattern of the crystals is shown in FIG. 10.

EXAMPLE 16

Figure 11:
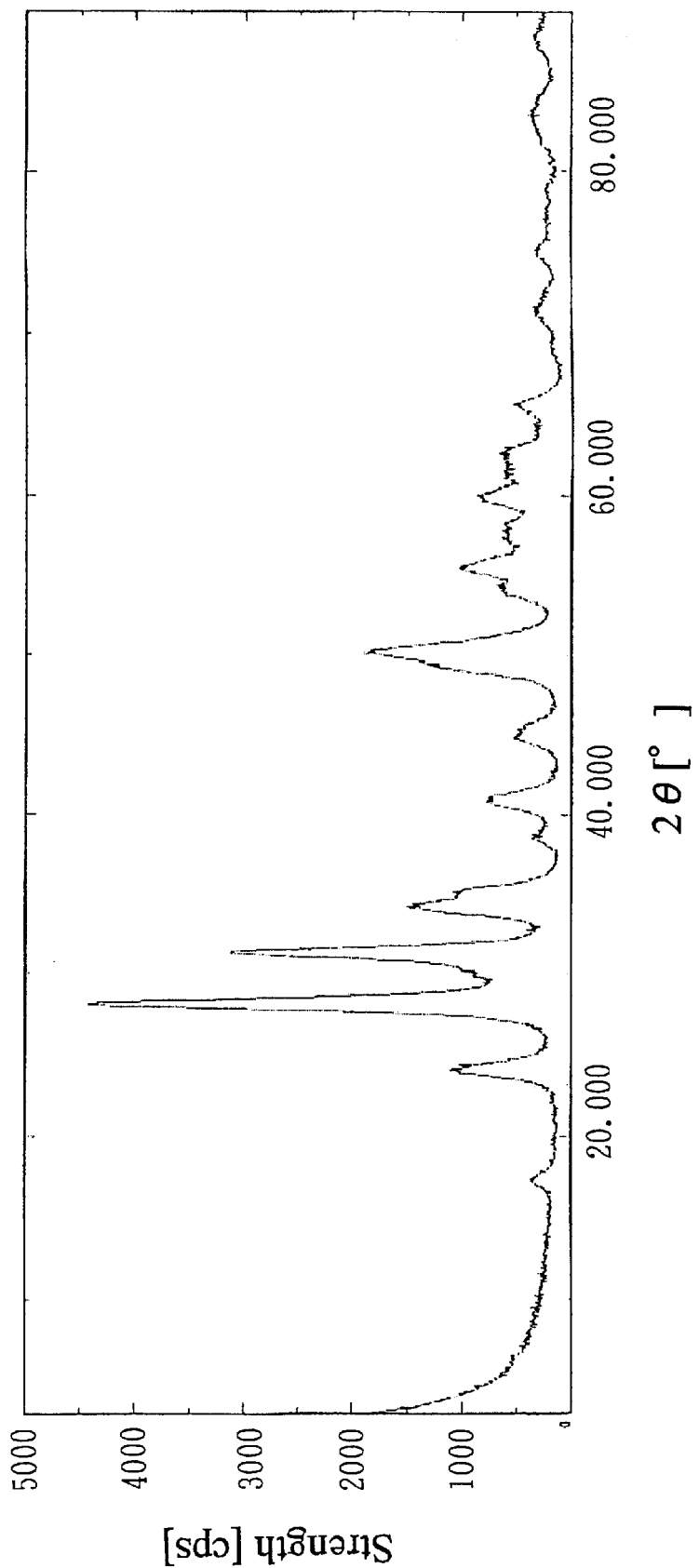
FIG. 11 is an X-ray diffraction spectrum of the zirconium oxide obtained in Example 16.

In 400 ml of methanol was completely dissolved 4 g of zirconium sulfate tetrahydrate ($Zr(SO_4)_2 \cdot 4H_2O$) by stirring, and the solution was refluxed in a flask equipped with a condenser for 3 hours. After cooling, the precipitate thus formed was collected by filtration, aged at 15° C. and 95% RH for 24 hours, and dried in vacuo to obtain a zirconium oxide precursor. The precursor was fired at 700° C. to give monoclinic zirconium oxide. The X-ray diffraction pattern of the crystals is shown in FIG. 11.

EXAMPLE 17

Figure 12:
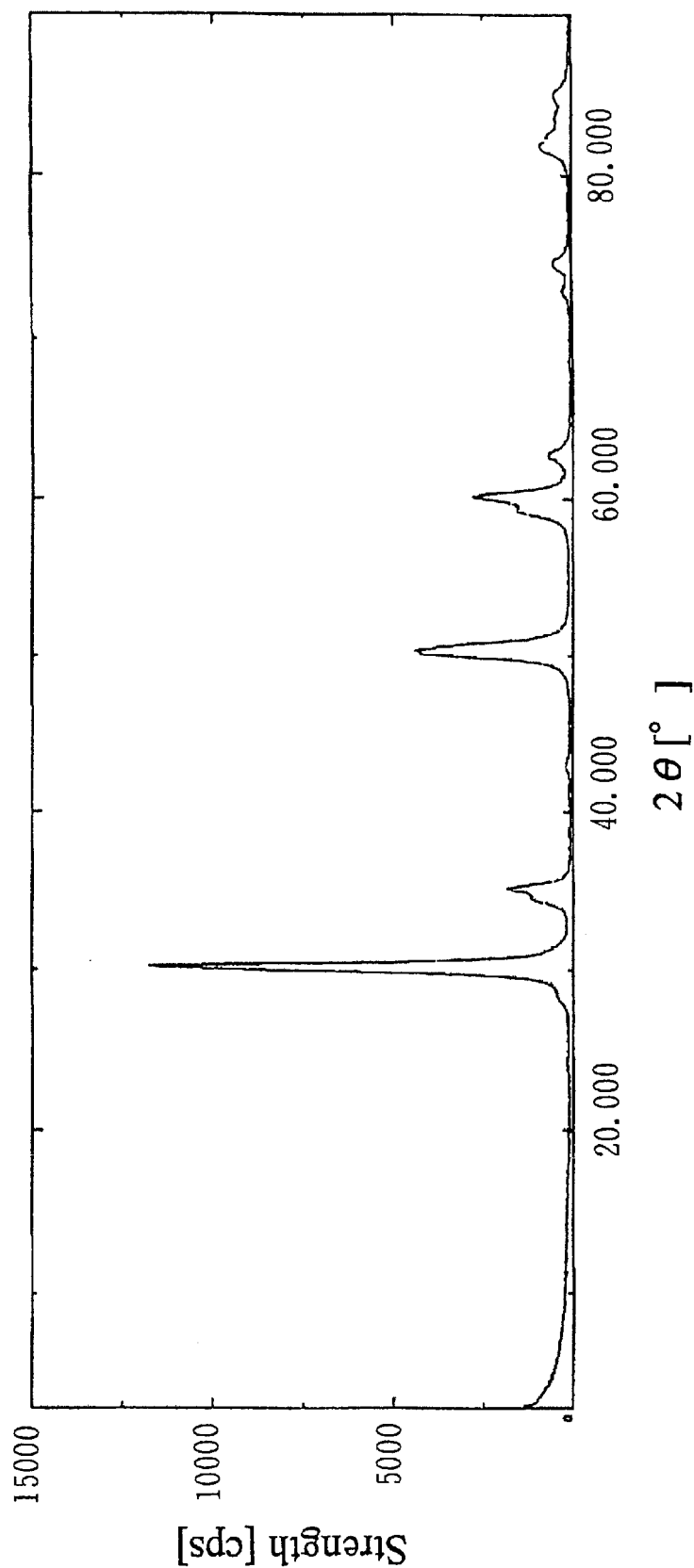
FIG. 12 is an X-ray diffraction spectrum of the zirconium oxide obtained in Example 17.

In 400 ml of methanol was completely dissolved 4 g of zirconium sulfate tetrahydrate ($Zr(SO_4)_2 \cdot 4H_2O$) by stirring, and the solution was refluxed in a flask equipped with a condenser for 3 hours. After cooling, the precipitate thus formed was collected by filtration and dried in vacuo to obtain a zirconium oxide precursor. The precursor was fired at 700° C. to give zirconium oxide having a cubic crystal structure. The X-ray diffraction pattern of the crystals is shown in FIG. 12.

Figure 2:
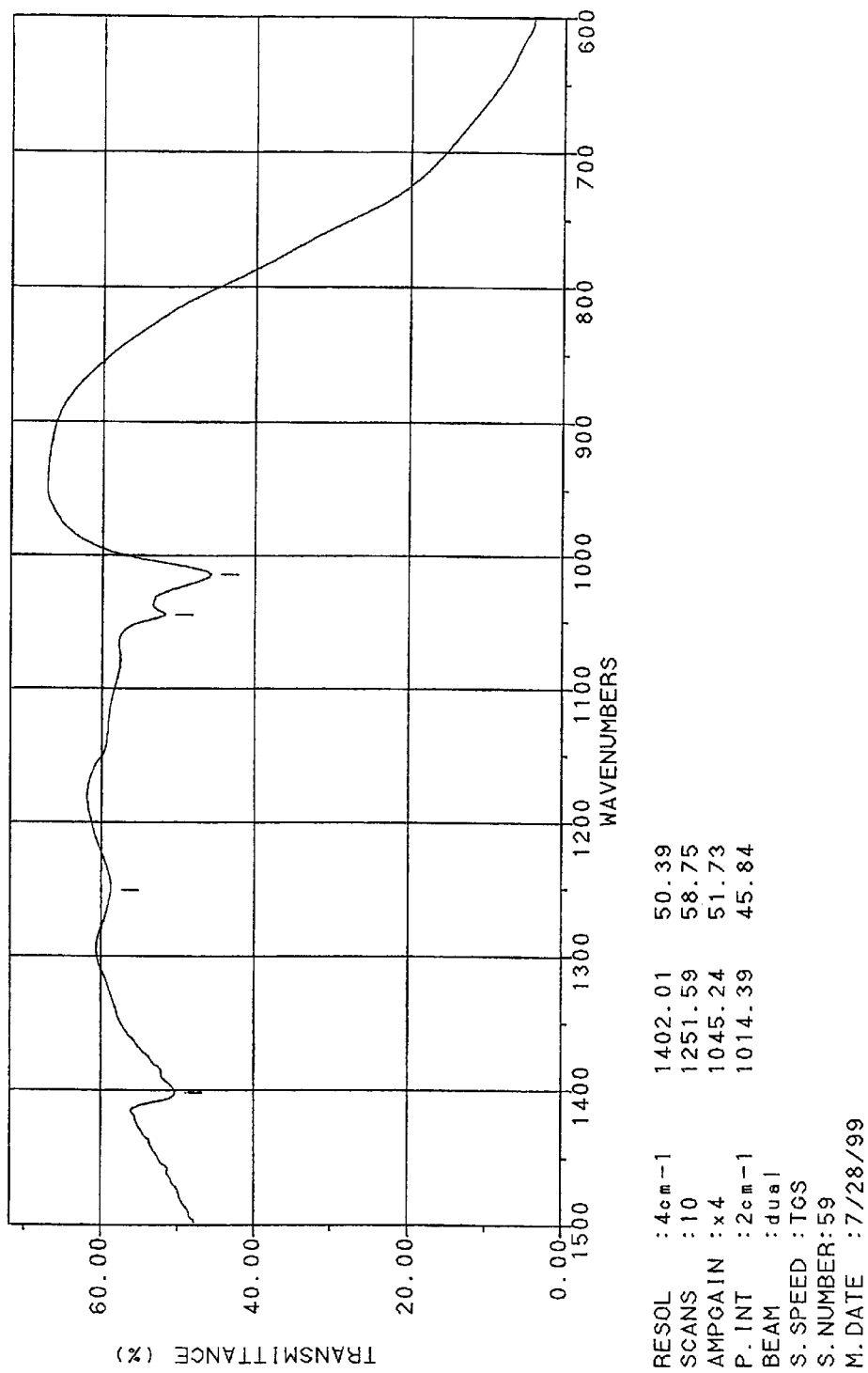
Figure 3:
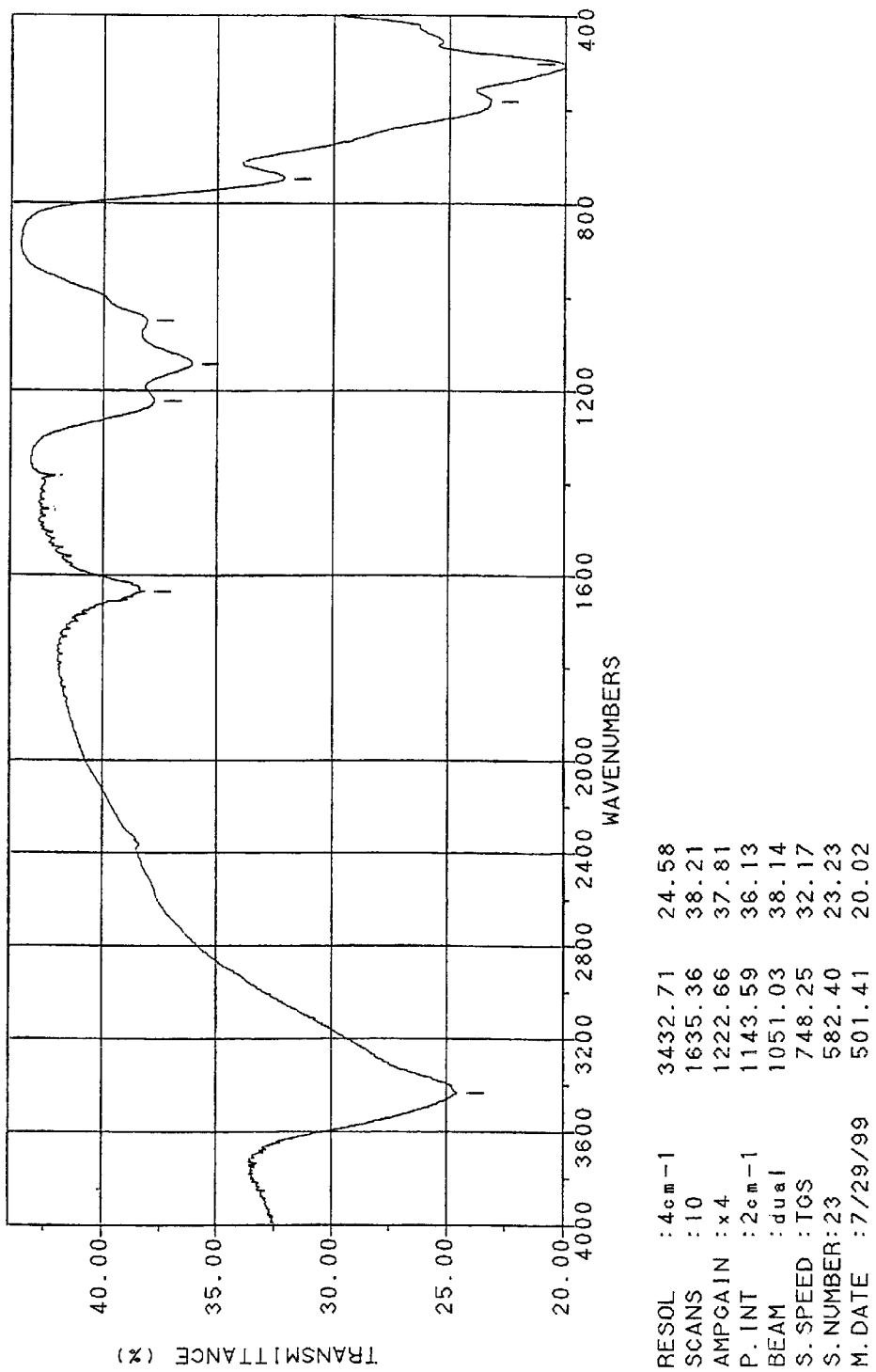
FIGS. 3 and 4 are infrared absorption spectra of commercially available sulfated zirconia.
Figure 4:
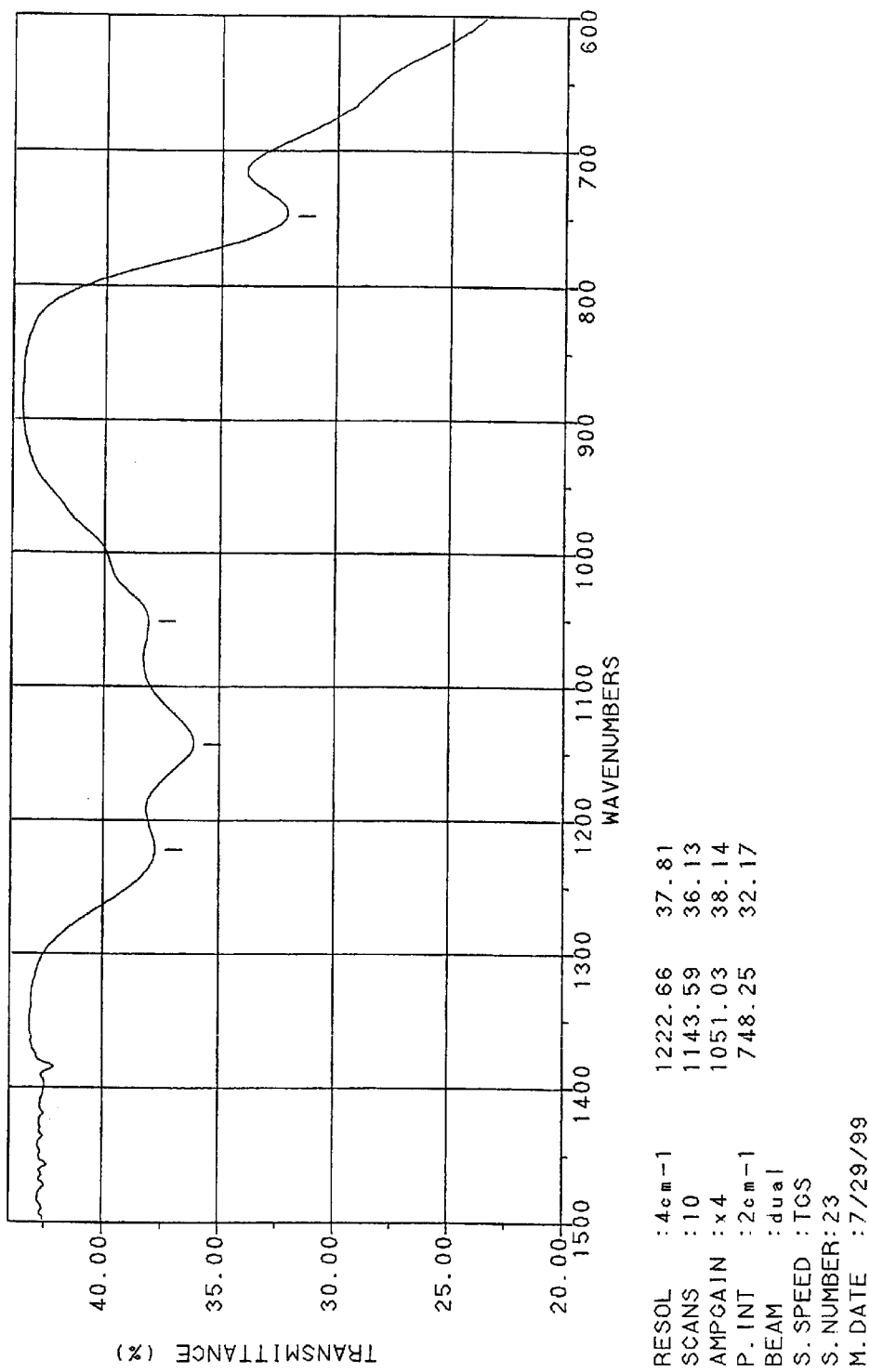

The resultant zirconium oxide had the same infrared absorption spectrum as shown in FIGS. 1 and 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a zirconium oxide precursor comprising the steps of: dissolving a zirconium sulfate in an alcohol to form a solution, immersing a substrate in the solution, and precipitating a zirconium oxide precursor on the substrate.

2. The process according to claim 1, wherein the zirconium sulfate comprises zirconium sulfate tetrahydrate.

3. The process according to claim 1, wherein the alcohol comprises methanol.

4. The process according to claim 1, wherein the precipitating step is performed without requiring a heating step for crystallization for stabilization.

* * * * *